(12) United States Patent
Hamamoto (10) Patent No.: US 11,630,207 B2
(45) Date of Patent: Apr. 18, 2023

(54) FLYING BODY

(71) Applicant: MITSUBISHI HEAVY INDUSTRIES, LTD., Tokyo (JP)

(72) Inventor: Koichi Hamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 636 days.

(21) Appl. No.: 16/625,039

(22) PCT Filed: Dec. 11, 2017

(86) PCT No.: PCT/JP2017/044366
§ 371 (c)(1),
(2) Date: Apr. 3, 2020

(87) PCT Pub. No.: WO2019/033468
PCT Pub. Date: Jan. 3, 2019

(65) Prior Publication Data
US 2020/0284911 A1 Sep. 10, 2020

(30) Foreign Application Priority Data

Jun. 28, 2017 (JP) .............................. JP2017-125795

(51) Int. Cl.
*G01S 17/42* (2006.01)
*B64G 3/00* (2006.01)

(52) U.S. Cl.
CPC ................ *G01S 17/42* (2013.01); *B64G 3/00* (2013.01)

(58) Field of Classification Search
CPC ........... G01S 17/42; G01S 17/74; B64G 3/00; B64G 1/52; B64G 1/66; B64C 39/02;
(Continued)

(56) References Cited

U.S. PATENT DOCUMENTS 5,844,526 A * 12/1998 Jones ..................... H01Q 15/16
239/548
6,050,526 A * 4/2000 Stribling, Jr. .......... B64G 1/222
244/172.8
(Continued)

FOREIGN PATENT DOCUMENTS

JP 2004-271349 9/2004
JP 2005-091286 4/2005
(Continued)

OTHER PUBLICATIONS

International Preliminary Report on Patentability and Written Opinion of the International Searching Authority dated Jan. 9, 2020 in International (PCT) Application No. PCT/JP2017/044366 with English translation.
(Continued)

*Primary Examiner* — Yonel Beaulieu
(74) *Attorney, Agent, or Firm* — Wenderoth, Lind & Ponack, L.L.P.

(57) ABSTRACT

A flying body, which prevents others from measuring precise position of the flying body and allows friends to measure precise position of the flying body, is provided. The flying body (10) is provided with a reflector (100), a controller (300) and an anti-reflection section (200). The reflector (100) is provided with a reflective surface, arranged in an aperture, which reflects a radiated laser. The controller (300) generates a control signal on a basis of a state of the flying body. The anti-reflection section (200) prevents a reflection of the laser by the reflective surface on a basis of the control signal.

10 Claims, 8 Drawing Sheets

(58) Field of Classification Search
CPC ...... B64C 39/024; G01N 21/00; G01N 21/25; G01N 21/41; G01N 21/47; G01N 2021/4702; G01N 2021/4771; G01N 2021/4776; G01N 2021/7773; G01N 2021/0636

See application file for complete search history.

(56) References Cited

U.S. PATENT DOCUMENTS

| | | | |
|---|---|---|---|
| 6,137,623 | A | 10/2000 | Roberson et al. |
| 6,233,088 | B1 | 5/2001 | Roberson et al. |
| 6,597,457 | B1* | 7/2003 | Silverglate ............ G01J 1/1626 356/236 |
| 7,515,257 | B1 | 4/2009 | Roe et al. |
| 2003/0112201 | A1* | 6/2003 | Mizuno ................. H01Q 19/30 342/75 |
| 2005/0061957 | A1 | 3/2005 | Kase |
| 2005/0151021 | A1* | 7/2005 | Hamilton ............... B64G 1/503 244/172.7 |
| 2008/0002191 | A1 | 1/2008 | Napierala et al. |
| 2012/0261513 | A1* | 10/2012 | Bresciani ................ G01S 5/163 356/615 |
| 2018/0301800 | A1* | 10/2018 | Wu .......................... H03F 3/19 |
| 2020/0028262 | A1* | 1/2020 | Fang .................. H04B 7/15535 |
| 2021/0055110 | A1* | 2/2021 | Knutson ............... G01S 19/428 |

FOREIGN PATENT DOCUMENTS

| | | |
|---|---|---|
| JP | 2008-039765 | 2/2008 |
| JP | 4458665 | 4/2010 |

OTHER PUBLICATIONS

International Search Report dated Feb. 20, 2018 in International (PCT) Application No. PCT/JP2017/044366.

* cited by examiner

FLYING BODY

TECHNICAL FIELD

The present invention is related to a flying body.

BACKGROUND ART

In order to precisely measure a position of a flying body which flies in a sky or a space, a method is known to provide the flying body with a reflector which reflects a laser. When a laser is radiated from a ground to the flying body, the reflector of the flying body reflects the radiated laser. By measuring an orientation, a delay time, a change in frequency of the reflected laser on the ground, the position of the flying body is precisely measured.

In Patent Literature 1, a reflector which controls an intensity of a reflected laser is disclosed. In addition, identifying a radiated laser and controlling the intensity of the laser that the reflector reflects are disclosed.

CITATION LIST

Patent Literature

[Patent Literature 1] Description of Japanese Patent No. 4458665 B2

SUMMARY OF THE INVENTION

In a case where a flying body flying in a sky or a space is provided with a reflector, others also can measure a precise position of the flying body by radiating a laser to the flying body. For this reason, the precise position of the flying body becomes known by others. In addition, in a case of controlling the reflector by identifying the radiated laser, an apparatus for identifying the laser becomes necessary.

In view of situations such as above, an objective of the present invention is to provide a flying body which prevents others from measuring a precise position of the flying body itself and enables friends to measure the precise position of the flying body itself. Other objective will be understood by following descriptions and explanations of embodiments.

In order to achieve the above described objective, a flying body related to the present invention is provided with a reflector, a controller and an anti-reflection section. The reflector is provided on an aperture with a reflective surface which reflects a radiated laser in a direction from which the laser is radiated. The controller generates a control signal in accordance with a state of the flying body itself. The anti-reflection section prevents a reflection of the laser by the reflective surface in accordance with the control signal.

The previously described anti-reflection section may be provided on the aperture of the reflector with a shutter which controls an intensity of the laser that the reflector reflects in accordance with the control signal.

The previously described shutter may be provided with a shutter driver, which performs a blocking and an opening of an optical path of the laser radiated to the reflective surface, and a controller which controls the blocking and the opening of the optical path performed by the shutter driver.

The state of the previously described flying body itself may include any one among a state in accordance with a position of the flying body, a state in accordance with a time and a state in accordance with a signal from an observation station which radiates the laser.

The previously described anti-reflection section may be provided with a rotation section which controls a direction of the reflective surface of the reflector in accordance with the controls signal.

The state of the previously described flying body itself may include any one among a state in accordance with a position of the flying body itself, a state in accordance with a time and a state in accordance with a signal from an observation station which radiates the laser.

The rotation section of the previously described flying body may, in a case where the position of the flying body itself is in an observation permission area, control the reflective surface to face a first direction and in a case where the position of the flying body itself is not in an observation permission area, control the reflective surface to face a second direction.

The previously described second direction may be a direction rotated from a vertical downward direction by a given angle or more.

A sensor, which observes Earth in a direction different from the direction of the previously described reflective surface, may be provided.

The previously described reflector may be further provided with a cylindrical extending section which extends from an end of the reflective surface in a direction away from the reflective surface.

The previously described flying body may be an artificial satellite.

According to the present invention, a measurement of a precise position of a flying body itself by others can be prevented.

DESCRIPTION OF EMBODIMENTS

Embodiment 1

Figure 1:
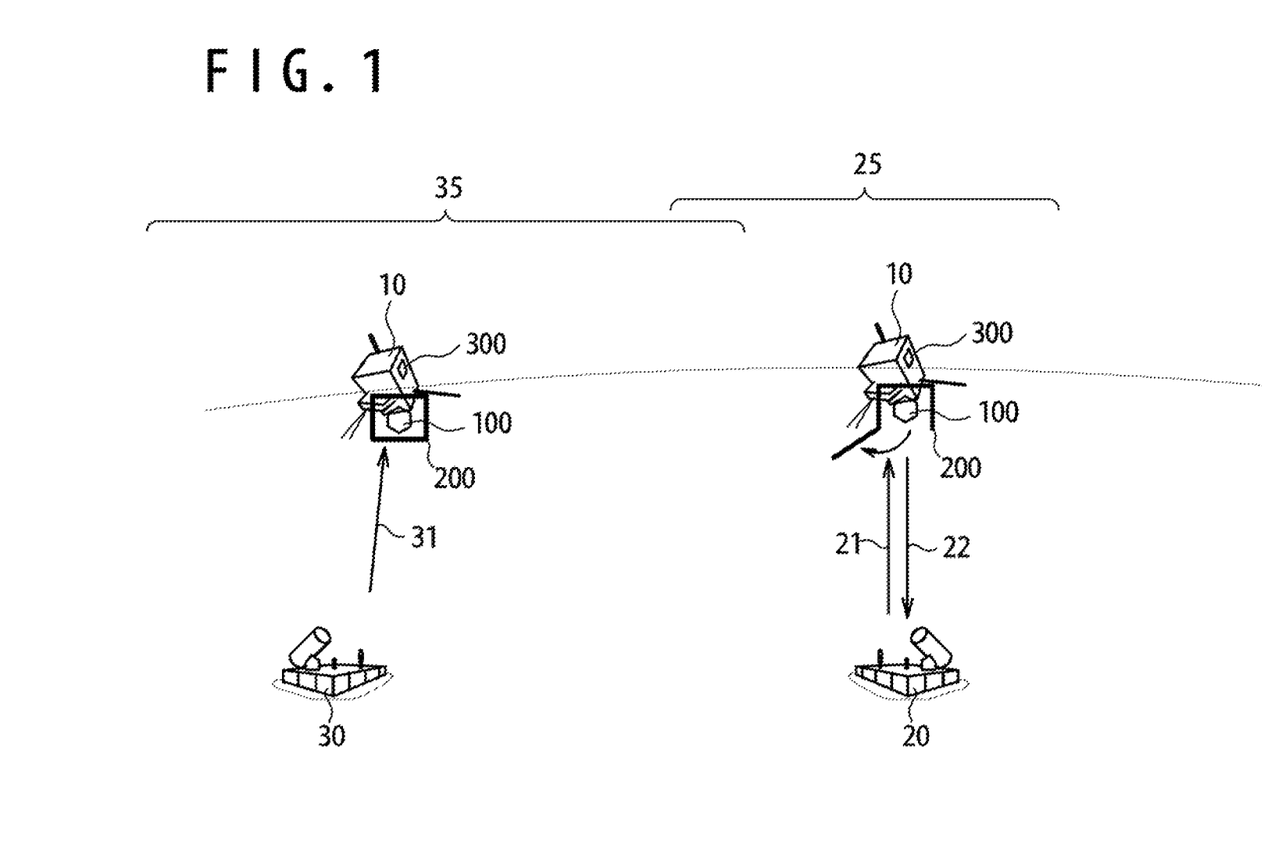
FIG. 1 is a diagram to explain an operation of an artificial satellite related to an embodiment 1.

As shown in FIG. 1, an artificial satellite 10 related to an embodiment 1 is provided with a reflector 100, a controller 300 and an anti-reflection section 200. The artificial satellite 10 does not reflect a laser 31 from other's observation station 30 and reflects a laser 21 from a friend's observation station 20. In particular, in other's observation area 35 that other's observation station 30 can observe, the artificial satellite 10 uses the anti-reflection section 200 to prevent the reflector 100 from reflecting the laser 31. For example, the anti-reflection section 200 is used to cover the reflector 100. For this reason, in the other's observation area 35, although the laser 31 is radiated from the other's observation station 30, the laser is not reflected. In the friend's observation area 25 that the friend's observation station 20 can observe, the artificial satellite 10 controls the anti-reflection section 200 so that the reflector 100 reflects the laser 21. For example, the artificial satellite 10 opens the anti-reflection section 200 to open the reflector 100. For this reason, in the friend's observation area 25, the artificial satellite 10 reflects the laser 21 radiated from the friend's observation station 20. Therefore, the friend's observation station 20 receives a reflected laser 22 reflected by the artificial satellite 10 and acquires a precise position of the artificial satellite 10. It should be noted that even if the position of the artificial satellite 10 is in the friend's observation area 25, in a case where the artificial satellite 10 is in the other's observation area 35, the artificial satellite 10 prevents the reflection of the laser 31 by use of the anti-reflection section 200. The anti-reflection section 200 drives in response to an electrical control signal that the controller 300 generates.

A configuration of the artificial satellite 10 related to the embodiment 1 will be explained. In the embodiment 1, the anti-reflection section 200 is provided with a shutter 280 which blocks a laser radiated to the reflector 100.

Figure 2A:
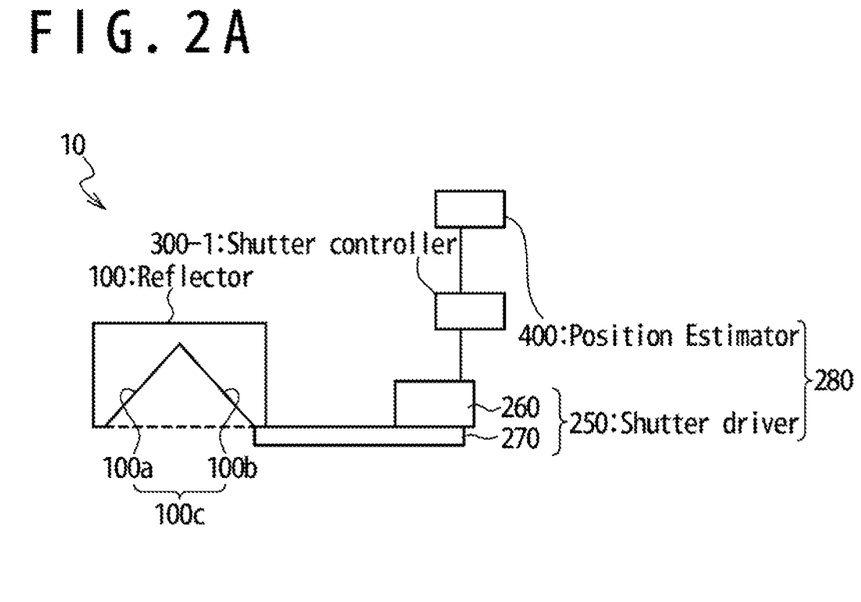
FIG. 2A is a configuration diagram of the artificial satellite in FIG. 1.

As shown in FIG. 2A, the shutter 280 of the artificial satellite 10 is provided with a shutter driver 250 and a position estimator 400. The controller 300 of the artificial satellite 10 is provided with a shutter controller 300-1. The position estimator 400 measures the position of the artificial satellite itself and the shutter controller 300-1 controls opening and/or closing of the shutter driver 250. Here, to aid an understanding, it will be explained with a direction in which the reflective surface 100c of the reflector 100 is provided, that is, the downward direction of the paper surface, is the downward direction.

The reflector 100 is provided with a reflective mirror 100a and a reflective mirror 100b. An end of the reflective mirror 100a and an end of the reflective mirror 100b are in contact and form a concave aperture in the reflector 100. The reflective mirror 100a and the reflective mirror 100b reflect a laser. When a laser is radiated from below to the aperture of the reflector 100, the laser is reflected by the reflective mirror 100a and the reflective mirror 100b. As a result, the laser is reflected in a direction from which the laser is radiated. A surface consisting of this reflective mirror 100a and this reflective mirror 100b will be called reflective surface 100c. The reflector 100 is, for example, a corner cube reflector.

Figure 2B:
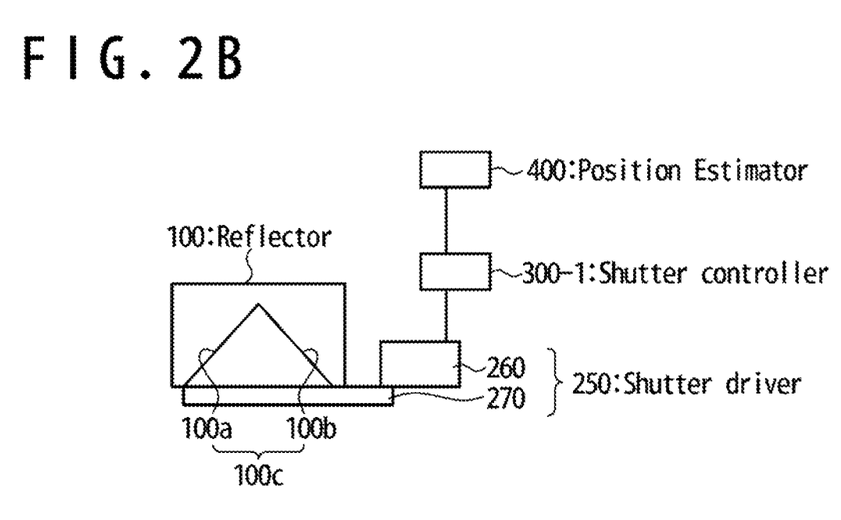
FIG. 2B is a diagram to explain a state in which a shutter in FIG. 2A is closed.

The shutter driver 250 is provided with a slider 260 and a shutter plate 270. The slider 260 controls a position of the shutter plate 270. The shutter plate 270 blocks the laser 31 radiated to the reflector 100 and prevents the laser 31 from being radiated to and reflected by the reflective surface 100c. That is, the shutter plate 270 is formed of materials which do not transmit a laser. Further, the shutter plate 270 is formed of materials which do not reflect a laser. In a case where the position of the artificial satellite itself is inside the other's observation area 35, the slider 260 is driven and moves the shutter plate 270 on an optical path of the laser radiated to the reflective surface 100c, as shown in FIG. 2B. That is, the shutter plate 270 covers the reflective surface 100c and blocks the optical path of the laser. In a case where the position of the artificial satellite itself is outside the other's observation area 35 and in the friend's observation area 25, the slider 260 is driven and moves the shutter plate 270 outside the optical path of the laser radiated to the reflective surface 100c, as shown in FIG. 2A. In other words, the shutter plate 270 moves to a position of not covering the reflective surface 100c and opens the optical path of the laser. In addition, the shutter plate 270 may be moved to a position of not overlapping the reflective surface 100c.

The position estimator 400 measures the position of the artificial satellite itself and generates a position signal. The position estimator 400 is provided with a star sensor which measures the position of the artificial satellite itself in accordance with positions of stars. The position estimator 400 measures the position of the artificial satellite itself by use of the star sensor and generates the position signal. The position signal includes information showing the position of the artificial satellite itself. The generated position signal is transmitted to the shutter controller 300-1.

The shutter controller 300-1 controls the shutter driver 250 in accordance with the position of the artificial satellite itself. For this reason, the shutter controller 300-1 is connected to the position estimator 400 and the slider 260 of the shutter driver 250. The shutter controller 300-1 receives the position signal from the position estimator 400. The shutter controller 300-1 extracts the position of the artificial satellite itself from the received position signal and verifies whether the position of the artificial satellite itself exists in the other's observation area 35. In addition, the shutter controller 300-1 verifies whether the artificial satellite itself exists in the friend's observation area 25. As a result, the shutter controller 300-1 controls the shutter driver 250 and performs opening and closing of the shutter plate 270.

Next, operations of the artificial satellite 10 will be explained.

Figure 3:
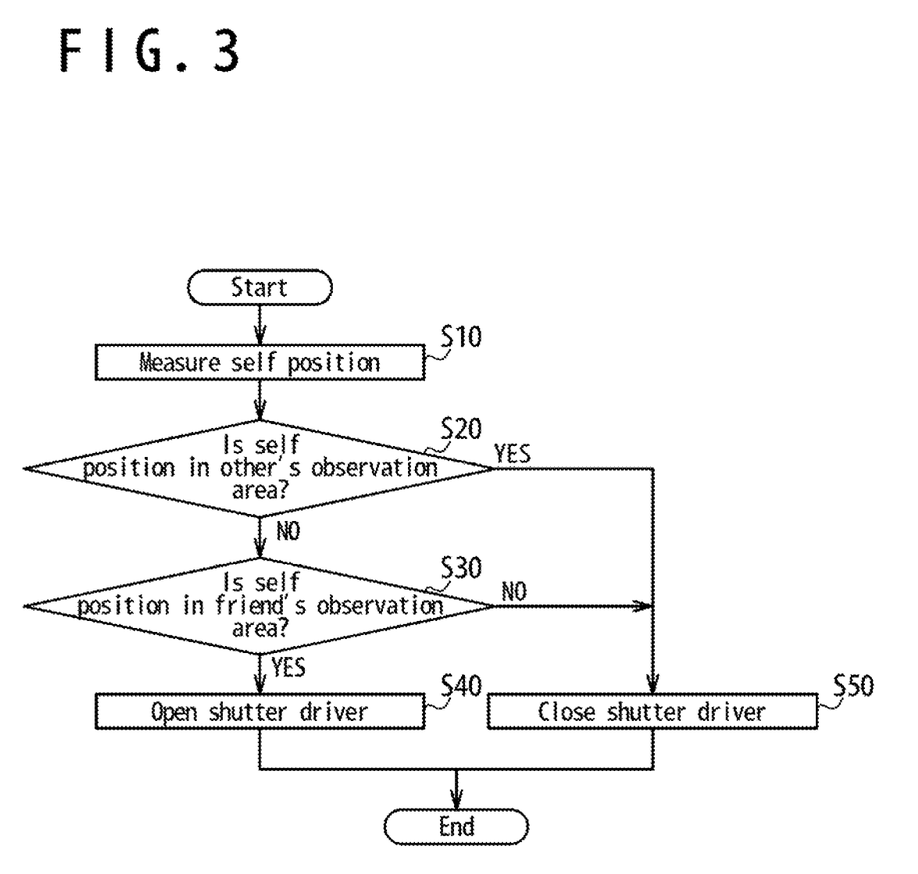
FIG. 3 is a flowchart related to a process of the artificial satellite in FIG. 1.

In the step S10 (referred as S10 in the following; other steps will be referred similarly with symbols only), as shown in FIG. 3, the position estimator 400 of the artificial satellite 10 measures the position of the artificial satellite 10 itself by using the star sensor. For example, latitude and longitude of a ground in a vertical downward direction from the position of the artificial satellite itself are measured as the position of the artificial satellite itself. The position estimator 400 generates the position signal in accordance with the measurement result. In addition, the position estimator 400 may further measure an altitude of the artificial satellite itself as the position of the artificial satellite itself.

Next, in S20, the shutter controller 300-1 verifies whether the position of the artificial satellite itself exists in the other's observation area 35. In particular, the shutter controller 300-1 receives the position signal from the position estimator 400 and acquires the position of the artificial satellite itself. The shutter controller 300-1 verifies whether the position of the artificial satellite itself exists in the other's observation area 35. In a case of existing in the other's observation area 35, the process moves to S50 and the shutter driver 250 is closed. That is, the shutter controller 300-1 generates a shutting signal to transmit to the slider 260. The slider 260 moves the shutter plate 270 in accordance with to the received shutting signal. As a result, as shown in FIG. 2B, the shutter plate 270 covers the reflective surface 100c of the reflector 100. As a result, the laser 31 radiated from the other's observation station 30 is blocked by the shutter plate 270 and is not reflected. In a case where the position of the artificial satellite itself does not exist in the other's observation area 35, the process moves to S30. It should be noted that the other's observation area 35 is specified in advance.

In S30, the shutter controller 300-1 verifies whether the position of the artificial satellite itself exists in the friend's observation area 25. In a case where the position of the artificial satellite itself exists in the friend's observation area 25, the process moves to S40 and the shutter driver 250 is opened. That is, the shutter controller 300-1 generates an opening signal to transmit to the slider 260. The slider 260 moves the shutter plate 270 in accordance with the received opening signal. As a result, as shown in FIG. 2A, the shutter plate 270 moves to the position of not covering the reflective surface 100c. As a result, the laser 21 radiated from the friend's observation station 20 is reflected by the reflector 100. That is, the friend's observation station 20 can observe a reflected laser 22 and measure a precise position of the artificial satellite 10. In a case where the position of the artificial satellite itself does not exist in the friend's observation area 25, the process moves to S50 and the shutter driver 250 is closed. For this reason, in a case where the artificial satellite 10 does not exist in the friend's observation area 25, regardless of whether the artificial satellite 10 exists in the other's observation area 35, the artificial satellite 10 closes the shutter driver 250. It should be noted that the friend's observation area 25 is specified in advance.

By operating as above, the artificial satellite 10 does not reflect the laser 31 from the other's observation station 30 in a case of existing in the other's observation area 35. For this reason, an observation of the precise position of the artificial satellite 10 by the other's observation station 30 can be prevented. In addition, the artificial satellite 10 reflects the laser 21 from the friend's observation station 20 in a case of existing in the friend's observation area 25. For this reason, the friend's observation station 20 can measure the precise position of the artificial satellite 10.

Embodiment 2

In the embodiment 1, an area such that a laser 31 from the other's observation station 30 reaches the artificial satellite 10 in the area corresponds to the other's observation area 35. Here, an example will be shown in which, although in a case where the laser 31 from the other's observation station 30 reaches the artificial satellite 10, the shutter driver 250 can be opened in a case where the artificial satellite 10 is away from the other's observation station 30.

Figure 4:
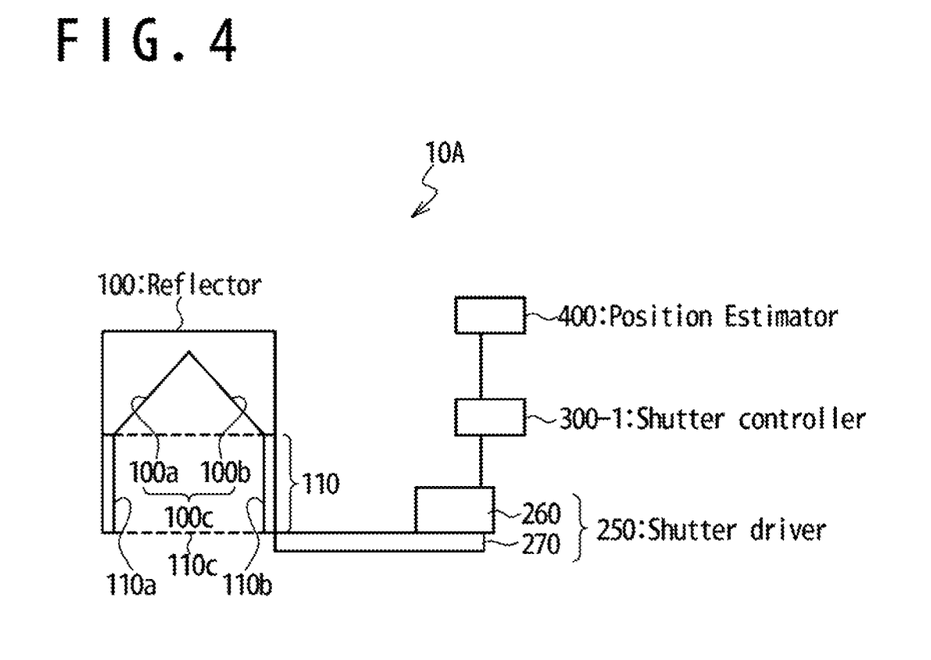
FIG. 4 is a configuration diagram of an artificial satellite related to an embodiment 2.

As shown in FIG. 4, in the artificial satellite 10A related to the embodiment 2, the reflector 100 is further provided with an extending section 110. Other configuration of the artificial satellite 10A is similar to the artificial satellite 10.

The extending section 110 has a cylindrical shape extending from an end of the reflective surface 100c in a downward direction. Inner surfaces 110a, 110b of the extending section 110 is formed along the end of the reflective surface 100c. A lower end of the extending section 110 is provided with an opened aperture surface 110c. The aperture surface 110c is formed so as to oppose to the reflective surface 100c. Cross sectional surfaces which orthogonally cross the inner surface 110a and the inner surface 110b of the extending section 110 have a same shape regardless of positions of the cross sectional surfaces. That is, the cross sectional surfaces have a same shape as the aperture surface 110c. In addition, the inner surfaces 110a, 110b of the extending section 110 do not reflect any laser. For this reason, a laser with an inclination of a specific level or more from a direction orthogonal to the aperture surface 110c of the extending section 110 (hereinafter called axial direction of the extending section 110) is radiated to the inner surfaces 110a, 110b of the extending section 110, do not reach the reflective surface 100c and is not reflected. In a case where the artificial satellite 10 is away from the other's observation station 30, the laser 31 radiated from the other's observation station 30 is inclined of a specific level or more from the axial direction of the extending section 110. For this reason, the laser 31 does not reach the reflective surface 100c and is not reflected. A length of the extending section 110 in a vertical upward or downward direction is determined by a size of the reflective surface 100c and a range of an angle of incidence with which the laser reflection is allowed. In a case of setting the range of the angle of incidence of the laser broader, the length of the extending section 110 in the vertical upward or downward direction, related to the size of the reflective surface 100c, is set shorter.

As above, even if the artificial satellite 10A is in an area where the laser 31 from the other's observation station 30 reaches, the artificial satellite 10A does not reflect the laser 31. For this reason, the other's observation area 35 of the artificial satellite 10A is smaller than the other's observation area 35 of the artificial satellite 10. In addition, an area where the friend's observation area 25 and the other's observation area 35 overlap of the artificial satellite 10A is smaller than the one of the artificial satellite 10 as well. Therefore, even in a case where a distance between the other's observation station 30 and the friend's observation station 20 is short, a precise position of the artificial satellite 10A can be measured from the friend's observation station 20.

Embodiment 3

Figure 5:
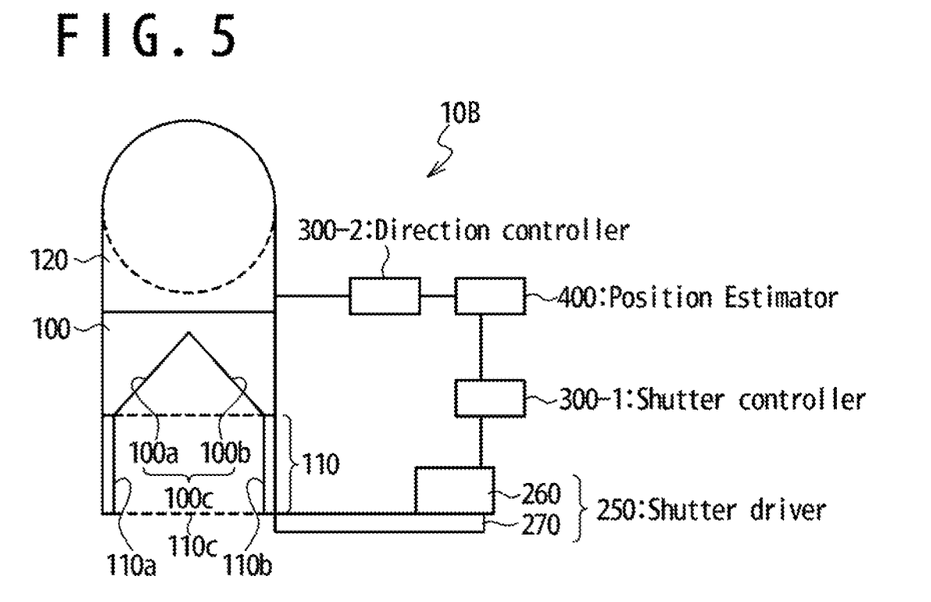
FIG. 5 is a configuration diagram of an artificial satellite related to an embodiment 3.

In the embodiment 2, an example was shown in which the reflective surface 100c of the reflector 100 is always facing a direction to a center of Earth. In an artificial satellite 10B related to the embodiment 3, by controlling the direction of the reflective surface 100c of the reflector 100, the other's observation area 35 of the artificial satellite 10B is smaller than the other's observation area 35 of the artificial satellite 10A.

As shown in FIG. 5, the reflector 100 of the artificial satellite 10B is further provided with a direction changing section 120. In addition, the controller 300 of the artificial satellite 10B is further provided with a direction controller 300-2.

The direction controller 300-2 generates a direction signal in accordance with the position signal received from the position estimator 400. The position of the artificial satellite itself is included in the position signal. The direction controller 300-2 extracts the position of the artificial satellite itself from the position signal. In addition, the direction controller 300-2 calculates a relative direction of the friend's observation station 20 with respect to the extracted position of the artificial satellite itself. The direction controller 300-2 generates the direction signal including the calculated relative direction.

Figure 6:
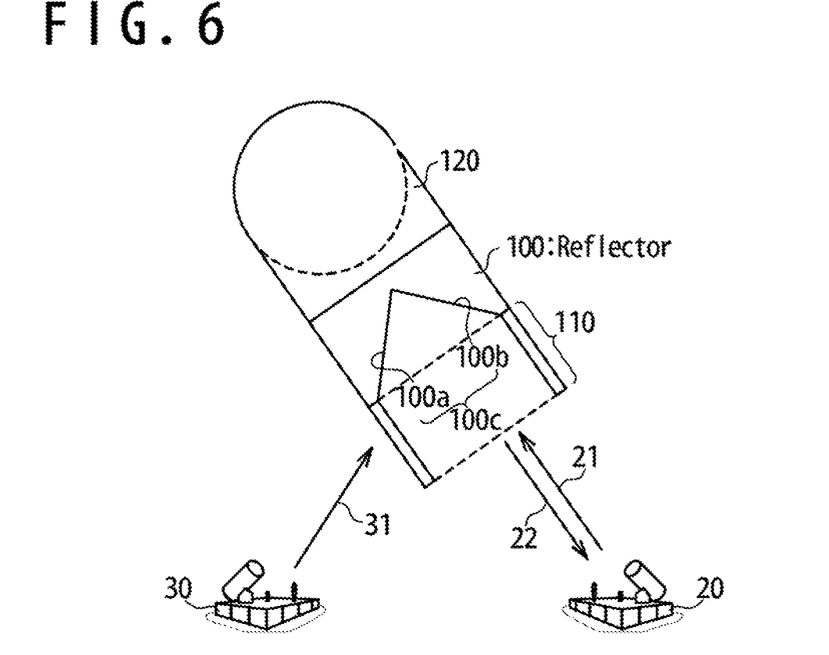
FIG. 6 is a diagram to explain an operation of an artificial satellite in FIG. 5.

The direction changing section 120 orients the reflective surface 100c in a direction of the friend's observation station 20 in accordance with the direction signal. That is, as shown in FIG. 6, the axial direction of the extending section 110 becomes the direction of the friend's observation station 20. For this reason, the incident direction of the laser 21 radiated from the friend's observation station 20 becomes same as the axial direction of the extending section 110 and the friend's observation are 25 becomes larger. In addition, the incident direction of the laser 31 radiated from the other's observation station 30 is inclined by a specified level or more from the axial direction of the extending section 110. For this reason, the laser 31 radiated from the other's observation station 30 does not reach the reflective surface 100c and is not reflected. As a result, the other's observation area 35 is small. The direction changing section 120 changes the direction of the reflective surface 100c by use of a spherical motor, for example.

As above, the other's observation area 35 of the artificial satellite 10B is smaller than the other's observation area 35 of the artificial satellite 10A. Further, the friend's observation area 25 of the artificial satellite 10B is larger than the friend's observation area 25 of the artificial satellite 10A. For this reason, even in a case where a distance between the other's observation station 30 and the friend's observation station 20 is further shorter, the precise position of the artificial satellite 10B can be measured from the friend's observation station 20.

The position of the friend's observation station 20 is registered to the direction controller 300-2 in advance. In addition, the position of the friend's observation station 20 may be received by the artificial satellite 10B from the friend's observation station 20. In this case, the shutter plate 270 may be closed until the position of the friend's observation station 20 is received from the friend's observation station 20.

Embodiment 4

In previously described embodiments, examples were shown of controlling laser reflection by shutter driver 250 which blocks a laser radiated to the reflector 100. The embodiment 4 shows an example of preventing a reflection of the laser 31 in the other's observation area 35 by rotating the reflector 100 around an axis parallel to the ground.

Figure 7:
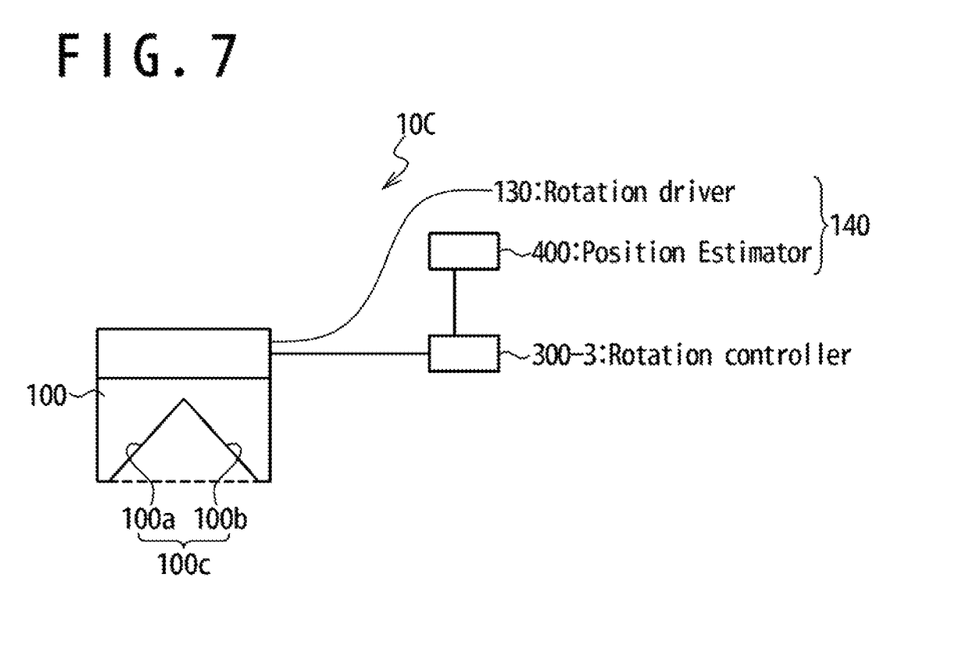
FIG. 7 is a configuration diagram of an artificial satellite related to an embodiment 4.

As shown in FIG. 7, the controller 300 of an artificial satellite 10C related to the embodiment 4 is provided with a rotation controller 300-3. The anti-reflection section 200 is provided with a rotation section 140. The rotation section 140 is provided with a rotation driver 130 and the position estimator 400. The reflector 100 and the position estimator 400 function similarly to the previously described embodiments. Here, in the reflector 100, a back surface and a side surface of the reflective surface 100c are non-reflective surfaces which do not reflect any laser.

The rotation driver 130 controls a direction of the reflective surface 100c of the reflector 100 in accordance with a signal from the rotation controller 300-3. The rotation driver 130 controls a rotation by use of a motor, for example.

Figure 8A:
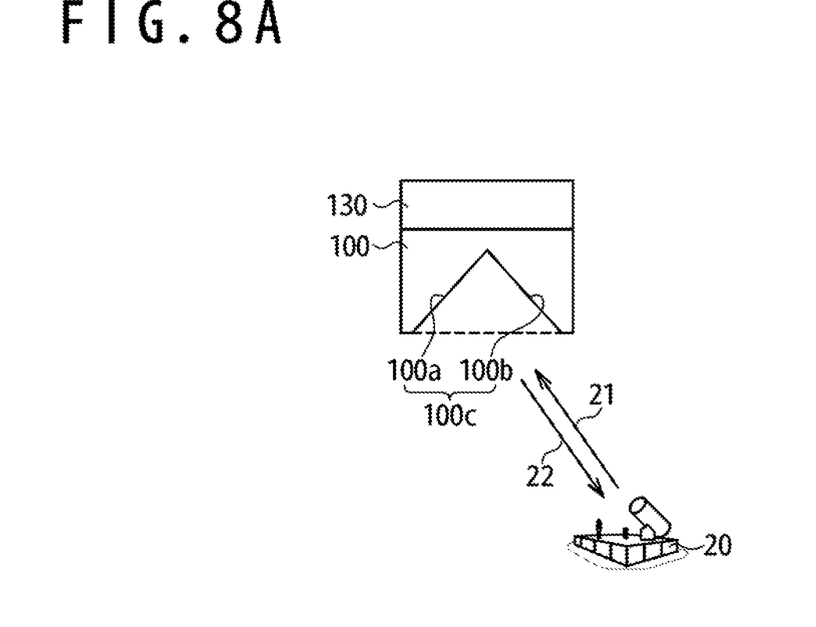
FIG. 8A is a diagram to explain an operation of an artificial satellite in FIG. 7.
Figure 8B:
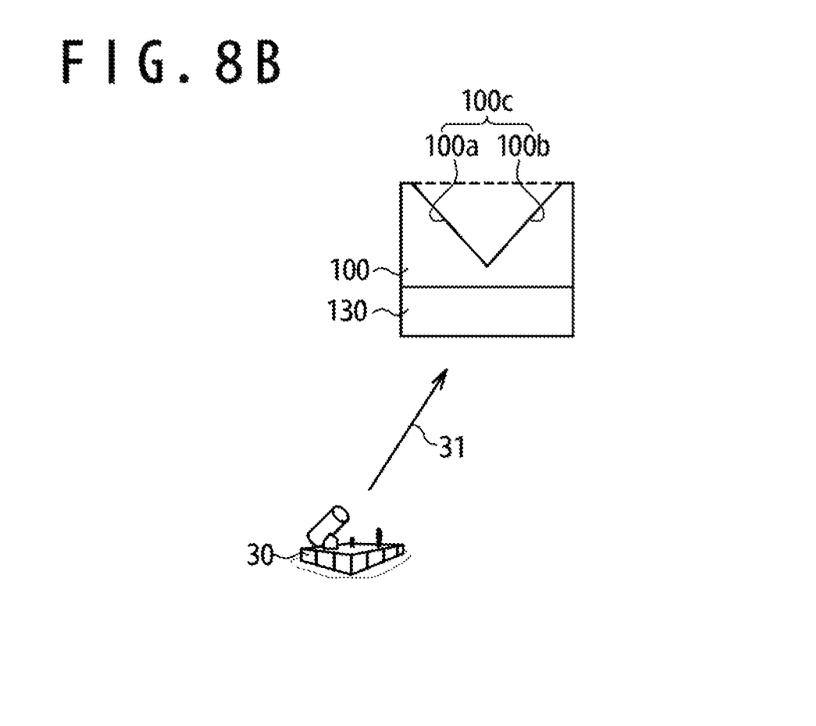
FIG. 8B is a diagram to explain an operation of an artificial satellite in FIG. 7.

The rotation controller 300-3 controls the rotation driver 130 in accordance with the position signal received from the position estimator 400. The rotation controller 300-3 extracts the position of the artificial satellite itself from the position signal. The rotation controller 300-3 controls the rotation of the rotation driver 130 in accordance with the extracted position of the artificial satellite itself. In particular, as shown in FIG. 8A, in a case where the position of the artificial satellite itself exists in the friend's observation area 25, the rotation controller 300-3 generates the rotation signal, to make a rotation such that the reflective surface 100c faces in the downward direction, to transmit to the rotation driver 130. The rotation driver 130 controls the direction of the reflective surface 100c in accordance with the rotation signal generated by the rotation controller 300-3. As a result, the reflector 100 reflects a laser from the ground. In other words, the reflector 100 reflects the laser 21 radiated from the friend's observation station 20. In addition, in a case where the position of the artificial satellite itself exists in the other's observation area 35, as shown in FIG. 8B, the rotation controller 300-3 generates a rotation signal to make the reflective surface 100c of the reflector 100 rotate until an angle in which the reflective surface 100c of the reflector 100 does not reflect any laser from the ground. The rotation driver 130 controls the direction of the reflective surface 100c in accordance with the rotation signal generated by the rotation controller 300-3. As a result, the direction of the reflective surface 100c is made to rotate by a specific angle or more from the vertical downward direction. For example, the direction of the reflective surface 100c is made to rotate by 100 degrees or more from the vertical downward direction. The direction of the reflective surface 100c may be made to rotate by 135 degrees or more. In addition, the direction of the reflective surface 100c may be made to rotate by 180 degrees. As a result, the reflector 100 does not reflect any laser from the ground. In other words, the reflector 100 does not reflect the laser 31 radiated from the other's observation station 30. It should be noted that this angle can be determined in accordance with an altitude of the artificial satellite 10C, a range of incident direction of the laser that the reflective surface 100c can reflect and a range of angle with which a laser can be radiated from the other's observation station 30. That is, this angle changes in accordance with the altitude of the artificial satellite 10C or the like. For example, the higher the altitude of the artificial satellite 10C is, the smaller the angle of making the reflective surface 100c to rotate is.

As above, by providing the reflector 100 with the rotation driver 130, the friend's observation station 20 can observe the precise position of the artificial satellite 10C. In addition, the precise position of the artificial satellite 10C cannot be observed at the other's observation station 30.

Figure 9:
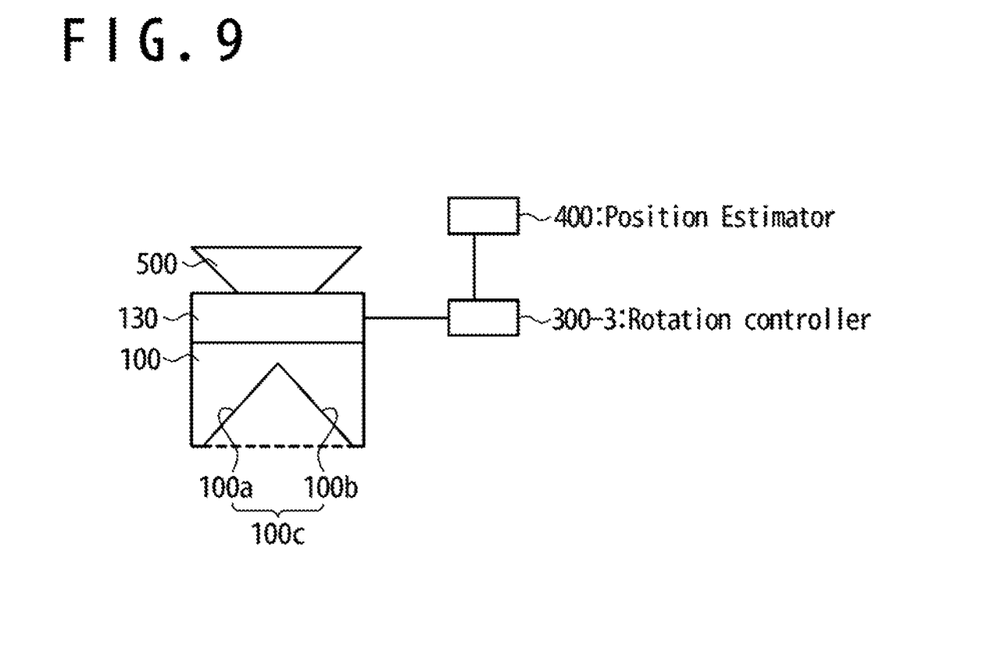
FIG. 9 is a diagram to explain a variation example of the artificial satellite related to the embodiment 4.

In addition, there is a case where the artificial satellite 10C aims to observe a vicinity of the other's observation station 30. In this case, as shown in FIG. 9, a sensor 500 which observes Earth (the ground, the atmosphere, aircrafts, on the sea, in the sea and the like) may be provided on a back side of the reflector 100. Since a vicinity of the friend's observation station 20 is not needed to be observed, the reflective surface 100c of the reflector 100 is controlled to face the downward direction in the friend's observation area 25. As a result, the friend's observation station 20 can observe the precise position of the artificial satellite 10C. In addition, the sensor 500 is controlled to face downward direction in the other's observation area 35. As a result, the artificial satellite 10C can observe the other's observation area 35. Further, since the reflective surface 100c is facing upward at that time, the reflective surface 100c does not reflect any laser from the ground. For this reason, the other's observation station 30 cannot observe the precise position of the artificial satellite 10C. In addition, the sensor 500 may be provided, not at back side of the reflector 100 but in a direction different from the direction of the reflective surface 100c. The sensor 500 can be provided in an arbitrary direction different from the direction of the reflective surface 100c, as long as the reflective surface 100c reflects no laser from the other's observation area 35 while the sensor 500 is observing Earth.

Embodiment 5

In previously described embodiments, examples were shown of specifying the other's observation area 35 in advance. In the embodiment 5, an example of updating the other's observation area 35 will be shown.

Figure 10:
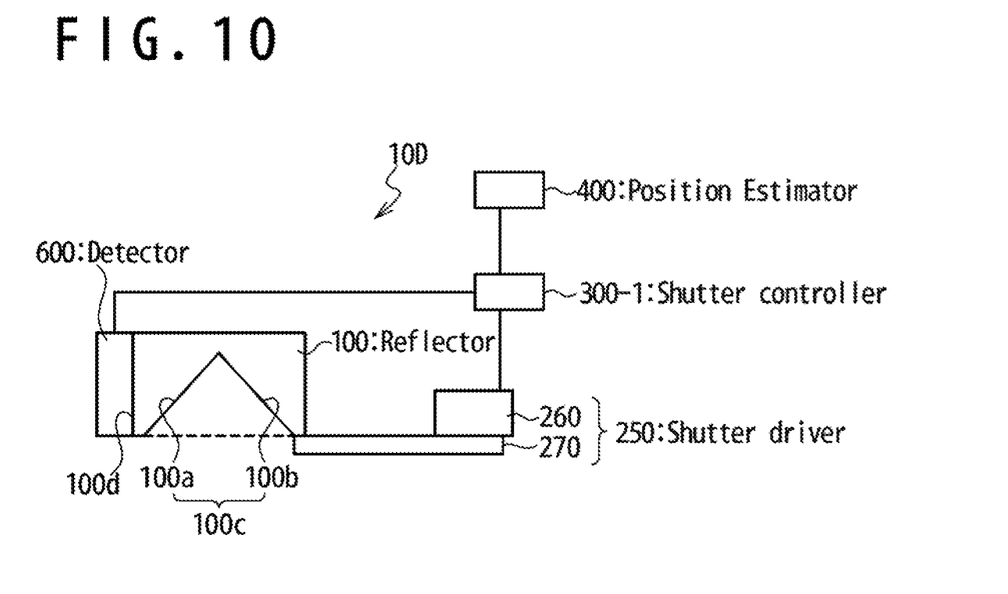
FIG. 10 is a configuration diagram of an artificial satellite related to an embodiment 5.

An artificial satellite 10D related to the embodiment 5 is further provided with a detector 600, as shown in FIG. 10. The detector 600 is provided adjacent to a side surface 100d of the reflector 100 and is connected to the shutter controller 300-1.

The detector 600 detects a laser from the ground and generates a detection signal including a frequency of the laser. A laser radiated from the friend's observation station 20 and the other's observation station 30 is radiated not only to the reflector 100 but also to the detector 600. For this reason, the detector 600 can detect a laser radiated to the reflector 100. The detector 600 generates the detection signal including specifications of the detected laser (for example, an orientation, a frequency, intensity, a wavelength, a pulse width and changes thereof of the radiation). For example, in a case where a laser phase changes by a specific time period, the detector 600 includes information acquired by this change into the detection signal.

The shutter controller 300-1 updates the other's observation area 35 in accordance with the detection signal. The shutter controller 300-1 determines from the detection signal whether the detected laser is one radiated from the friend's observation station 20. For example, in a case where a wavelength of the detected laser is same as a wavelength of the laser radiated at the friend's observation station 20, it is determined that the detected laser is one radiated from the friend's observation station 20. In addition, it may be determined by combining a plurality of characteristics included in laser specifications. In a case where the detected laser is not a laser radiated from the friend's observation station 20, it is determined that the position of the artificial satellite 10D at a time the laser was detected is included in the other's observation area 35. For this reason, the other's observation area 35 is updated.

As above, by providing the detector 600, the other's observation area 35 can be updated. For this reason, even in a case where the other's observation station 30 has been increased during operation, the precise position of the artificial satellite 10D is always prevented from being measured.

Further, the shutter controller 300-1 records position and time of laser detection and laser specifications. In a case where lasers radiated from outside the friend's observation station 20 are detected a plurality of times, an orbit of the artificial satellite 10D may be changed. As a result, a need occurs for the other's observation station 30 to observe the orbit of the artificial satellite 10D again.

Variation Example

An example in which the position estimator 400 measures the position of the artificial satellite itself by use of the star sensor has been shown, while it is not limited to this. As long as the position of the artificial satellite itself can be measured, any arbitrary method may be selected. For example, it may be a Sun sensor which measures the position of the artificial satellite itself by measuring a position of Sun. In addition, it may be an Earth sensor which measures the position of the artificial satellite itself by measuring a position of Earth. In addition, it may be provided with a navigation system using a gyro or the like. Further, Global Positioning System (GPS) signals may be received to measure the position of the artificial satellite itself.

Figure 11:
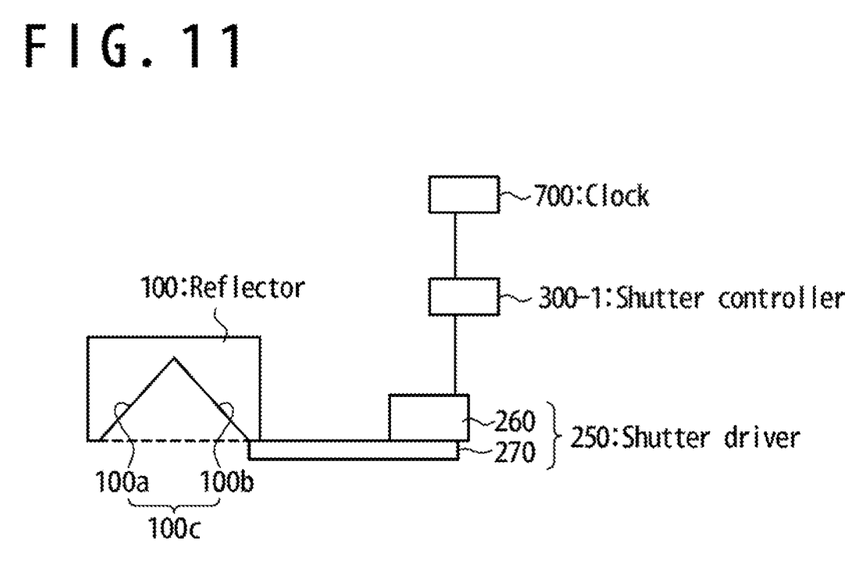
FIG. 11 is a configuration diagram of an artificial satellite related to a variation example.

In above described embodiments, an example of defining a state of the artificial satellite itself in accordance with the position of the artificial satellite itself measured by the position estimator 400 and controlling the intensity of the reflected laser or the direction of reflector 100 in accordance with the state has been shown, while it is not limited to this. As long as the laser 31 can be prevented from being reflected in the other's observation area 35 and the laser 21 can be reflected in the friend's observation area 25, any arbitrary method may be selected. For example, in a case where a flight orbit does not change significantly, the shutter driver 250 may be controlled in accordance with time information inside a flying body, that is, a current time. In other words, at a time it is determined that the position of the flying body is in the other's observation area 35, the shutter driver 250 is closed. At a time it is determined that the position of the flying body is in the friend's observation area 25, the shutter driver 250 is opened. That is, the state of the artificial satellite 10 is determined in accordance with the time and the shutter driver 250 is controlled in accordance with a change of the state. As a result, in a case where the artificial satellite itself is in the other's observation area 35, the laser 31 is not reflected and in a case where the artificial satellite itself is in the friend's observation area 25, the laser 21 is reflected. In this case, as shown in FIG. 11, the artificial satellite 10 is provided with a clock 700. The clock 700 generates a time signal to transmit to the shutter controller 300-1. The shutter controller 300-1 controls the shutter driver 250 in accordance with the time signal.

In addition, the friend's observation station 20 may request the artificial satellite 10 to open the shutter driver 250. For example, in a case where the position of the artificial satellite 10 moves from outside to inside the friend's observation area 25, the friend's observation station 20 generates the opening signal to transmit to the artificial satellite 10. The artificial satellite 10 opens the shutter driver 250 when receiving the opening signal. In addition, in a case where the position of the artificial satellite 10 moves from inside to outside the friend's observation area 25, the friend's observation station 20 generates the closing signal to transmit to the artificial satellite 10. The artificial satellite 10 closes the shutter driver 250 when receiving the closing signal. As a result, the artificial satellite itself does not reflect the laser 31 in a case where the artificial satellite itself is in the other's observation area 35 and the artificial satellite itself reflects the laser 21 in a case where the artificial satellite itself is in the friend's observation area 25. That is, the artificial satellite 10 controls the shutter driver 250 by switching between an opened state and a closed state in accordance with signals from the friend's observation station 20. In other words, the intensity of the reflected laser or the direction of the reflective surface 100c in the reflector 100 may be controlled in accordance with the state of the artificial satellite itself such as the state in accordance with the position of the artificial satellite itself, the state in accordance with the time, the state in accordance with signals from observation stations and the like.

In the above described embodiment, an example of closing the shutter driver 250 in a case where the position of the artificial satellite itself exists in the other's observation area 35 and opening the shutter driver 250 in a case where the position of the artificial satellite itself exists in the friend's observation area 25 has been shown. Here, in a case where opening and/or closing of the shutter driver 250 need(s) time, the shutter driver 250 may be closed even in a case where the position of the artificial satellite itself exists in the friend's observation area 25. For example, a position of the artificial satellite itself after a time necessary to close the shutter driver 250 is estimated from a position and a speed of the artificial satellite itself. In a case where the estimated position of the artificial satellite itself exists in the other's observation area 35, the shutter driver 250 is closed. By operating in this way, even in a case where a time was necessary to open or close the shutter driver 250, the artificial satellite 10 does not reflect the laser 31 radiated from the other's observations station 30. In addition, in a case of opening the shutter driver 250, even in a case where a time was necessary to open or close the shutter driver 250, it is preferable to open the shutter driver 250 in a case of existing in the friend's observation area 25.

In the above described embodiment, an example of a friend's observation area 25 which does not include the other's observation area 35 as an observation permission area has been shown while it is not limited to this. Any area in which the other's observation area 35 is not included and the friend's observation area 25 is included can be arbitrarily selected as the observation permission area. For example, a part of area of the friend's observation area 25 in which the other's observation area 35 is not included can be specified as the observation permission area.

In the above described embodiment, an example of controlling the direction of the reflective surface 100c of the reflector 100 by the rotation driver 130 has been shown, while it is not limited to this. Any arbitrary method may be selected as long as the reflective surface 100c of the reflector 100 can prevent a reflection of the laser 31 radiated from the other's observation station 30. For example, the direction of the reflective surface 100c may be controlled by rotating the artificial satellite 10C itself. For example, a reaction wheel, a torquer, a thruster or their combination can be used in order to rotate the artificial satellite 10C itself. In this case, the sensor 500 needs not to be provided to the reflector 100 as long as it is provided to the artificial satellite 10C.

In the above described embodiment, an example of preventing a reflection of the laser 31 radiated from the other's observation station 30 by the shutter driver 250 or the rotation driver 130 has been shown while it is not limited to this. Any arbitrary method can be selected if when the other's observation station 30 measures the position of the artificial satellite 10, a precise position cannot be measured. For example, the shutter plate 270 may be consisted of a translucent material. As a result, the intensity of the reflected laser can be weakened and the position measurement by the other's observation station 30 can be prevented. In addition, the shutter plate 270 may be always in a closed state and a laser transmittance of the shutter plate 270 may be controlled by use of a liquid crystal shutter of which transmittance is controlled by a voltage or the like. In this case, in a case where the artificial satellite 10 exists in the other's observation area 35, the laser transmittance is set to low to prevent the laser from reflecting at the reflective surface 100c. In a case where the artificial satellite 10 exists in the friend's observation area 25, the laser transmittance is set to high to make the laser to reflect at the reflective surface 100c. In addition, as shown in Patent Literature 1, the shapes of the reflective mirrors 100a, 100b may be changed to change the intensity of the reflected laser. In addition, in a case where the artificial satellite 10 exists in the other's observation area 35, an optical delay circuit may be provided on a path through which the laser incidents. If a delay of 1 ns can be realized by the optical delay circuit, the position of the artificial satellite 10 measured by the other's observation station 30 will be shifted by 15 cm from an actual position. It should be noted that a delay time by the optical delay circuit may be a value calculated in accordance with rules such as increasing delay time with time. In addition, those changes may be random. As a result, an effect such as increase of observation error and failure of observation occurring at the other's observation station 30 is obtained.

In addition, the slider 260 may be controlled so that the shutter plate 270 opens when an abnormality such as failure occurs. By opening the shutter plate 270 when an abnormality such as failure occurs, the friend's observation station 20 can measure the position of the artificial satellite 10 with a high precision. In addition, the slider 260 may be controlled so that the shutter plate 270 closes when an abnormality such as failure occurs. By closing the shutter plate 270, a measurement of the position of the artificial satellite 10 with a high precision by the other's observation station 30 can be prevented. Thus, those settings in accordance with an application of the artificial satellite 10 are particularly useful for a flying body of which maintenance is difficult during operation such as the artificial satellite 10. In addition, the shutter plate 270 may be made to open when an abnormality occurs by providing the shutter driver 250 with a biasing section which applies a force in a direction of opening the shutter plate 270. In addition, the shutter plate 270 may be made to close when an abnormality occurs by providing a biasing section which applies a force in a direction of closing the shutter plate 270.

In the embodiment 5, an example of providing the detector 600 adjacent to the reflector 100 has been shown, while it is not limited to this. The detector 600 may be provided to any arbitrary position as long as the detector 600 can detect a laser from the ground. For example, the detector 600 may be provided near the reflector 100. In addition, the detector 600 may be provided at a back side of the reflective surface 100c.

In the embodiment 5, an example of updating the other's observation area 35 in a case of detecting a laser radiated from outside the friend's observation station 20 has been shown, while it is not limited to this. For example, in a case of detecting a laser radiated from outside the friend's observation station 20, a history of laser detection is searched. As a result, in a case where a number of detection of laser radiated from outside the friend's observation station 20 has exceeded a predetermined value, it may be determined that an area within a specific range centered on the position of laser detection is the other's observation area 35.

In the embodiment 5, an example of determining by the shutter controller 300-1 whether a detected laser is radiated from the friend's observation station 20 has been shown, while it is not limited to this. For example, the shutter controller 300-1 may record a position and a time of laser detection and laser specifications and a ground station may determine when the artificial satellite 10D reaches a position where a communication can be performed with the ground station. In this case, it is determined whether detection time, laser wavelength, laser orientation, laser modulation method and the like correspond to the laser radiated from the friend's observation station 20.

The above described embodiment has been explained with the artificial satellite 10 as an example of flying body while it is not limited to this. Any flying body can be arbitrarily selected as long as the position thereof is measured by use of laser. For example, the flying body may be an aircraft.

As the above explained process is an example, an order and processing content of each step may be changed within a range of not inhibiting functions thereof. In addition, the explained configuration may be arbitrarily changed within a range of not inhibiting functions thereof. For example, the artificial satellite 10C provided with the rotation section 140 may be provided with the direction changing section 120 and direction controller 300-2. In addition, the artificial satellite 10C provided with the rotation section 140 may be provided with the detector 600.

The present application is based on Japanese patent application (No. 2017-125795) and claims a priority based on this application. Disclosed content of this application is incorporated to the present application by reference.

The invention claimed is:

1. A flying body comprising:
   a reflector which comprises a reflective surface arranged in an aperture and configured to reflect a laser in a direction opposite to a direction in which the laser is radiated to the reflector, wherein the laser is radiated from outside the flying body, and wherein the reflected laser is radiated outside the flying body;
   a controller configured to generate a control signal in accordance with a state of the flying body; and
   an anti-reflection section configured to prevent a reflection of the laser by the reflective surface based on the control signal.

2. The flying body according to claim 1,
   wherein the anti-reflection section comprises a shutter arranged at the aperture and configured to control an intensity of the laser reflected by the reflector based on the control signal.

3. The flying body according to claim 2,
   wherein the shutter comprises:
      a shutter driver configured to perform a blocking and an opening of an optical path of the laser radiated to the reflective surface; and
      a shutter controller configured to control the blocking and the opening of the optical path performed by the shutter driver.

4. The flying body according to claim 1,
   wherein the anti-reflection section comprises a rotation section configured to control a direction of the reflective surface of the reflector based on the control signal.

5. The flying body according to claim 1,
   wherein the state of the flying body includes any one among a state based on a position of the flying body, a state based on a time, and a state based on a signal from an observation station which radiates the laser.

6. The flying body according to claim 4,
   wherein the rotation section is configured:
      to control, when a position of the flying body is in an observation permission area, the reflective surface to face a first direction; and
      to control, when the position of the flying body is not in an observation permission area, the reflective surface to face a second direction different from the first direction.

7. The flying body according to claim 6,
   wherein the second direction is a direction rotated from a vertical downward direction by a given angle or more.

8. The flying body according to claim 6, further comprising a sensor configured to observe Earth in a direction different from the direction that the reflective surface faces.

9. The flying body according to claim 1,
   wherein the reflector further comprises a cylindrical extending section configured to extend from an end of the reflective surface in a direction away from the reflective surface.

10. The flying body according to claim 1,
   wherein the flying body is an artificial satellite.

* * * * *